United States Patent
Ji et al.

(10) Patent No.: US 9,100,162 B2
(45) Date of Patent: Aug. 4, 2015

(54) ADAPTIVE GENERATION OF CHANNEL STATE FEEDBACK (CSF) BASED ON BASE STATION CSF SCHEDULING

(75) Inventors: Zhu Ji, San Jose, CA (US); Navid Damji, Cupertino, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 13/601,270

(22) Filed: Aug. 31, 2012

(65) Prior Publication Data

US 2013/0273954 A1 Oct. 17, 2013

Related U.S. Application Data

(60) Provisional application No. 61/622,737, filed on Apr. 11, 2012.

(51) Int. Cl.
*H04W 72/00* (2009.01)
*H04L 5/00* (2006.01)

(52) U.S. Cl.
CPC ............ *H04L 5/006* (2013.01); *H04L 5/0046* (2013.01); *H04L 5/0057* (2013.01); *H04L 5/0078* (2013.01); *H04L 5/0091* (2013.01)

(58) Field of Classification Search
USPC .......... 455/422.1, 450–453, 456.2, 464, 509, 455/510; 370/395.41, 332; 375/7.141
See application file for complete search history.

(56) References Cited

U.S. PATENT DOCUMENTS

| 8,457,235 | B2 | 6/2013 | Ko et al. | |
|---|---|---|---|---|
| 2007/0189205 | A1* | 8/2007 | Terry et al. | 370/328 |
| 2008/0043677 | A1 | 2/2008 | Kim et al. | |
| 2008/0045228 | A1 | 2/2008 | Zhang et al. | |
| 2009/0046652 | A1 | 2/2009 | Shitara et al. | |
| 2009/0207784 | A1 | 8/2009 | Lee et al. | |
| 2009/0262854 | A1 | 10/2009 | Lee et al. | |
| 2010/0118817 | A1* | 5/2010 | Damnjanovic et al. | 370/329 |
| 2010/0322351 | A1 | 12/2010 | Tang et al. | |
| 2011/0077020 | A1* | 3/2011 | Zangi | 455/453 |
| 2011/0103247 | A1 | 5/2011 | Chen et al. | |
| 2011/0222472 | A1 | 9/2011 | Breit et al. | |
| 2011/0305161 | A1* | 12/2011 | Ekpenyong et al. | 370/252 |
| 2012/0147773 | A1* | 6/2012 | Kim et al. | 370/252 |
| 2013/0003788 | A1 | 1/2013 | Marinier et al. | |
| 2013/0121312 | A1* | 5/2013 | Roman et al. | 370/335 |

FOREIGN PATENT DOCUMENTS

| EP | 1931062 | 6/2008 |
|---|---|---|
| JP | 2007-189349 | 7/2007 |
| WO | 2007037218 | 4/2007 |
| WO | 2012112291 A1 | 8/2012 |

OTHER PUBLICATIONS

U.S. Appl. No. 12/993,330, filed Nov. 18, 2010; Sairamesh Nammi.

* cited by examiner

*Primary Examiner* — Dominic E Rego
(74) *Attorney, Agent, or Firm* — Meyertons, Hood, Kivlin, Kowert & Goetzel, P.C.

(57) ABSTRACT

Adaptive generation of channel state feedback (CSF) based on base station CSF scheduling. CSF report scheduling information may be received. CSF metrics may be generated based at least in part on the CSF report scheduling information. A CSF report including the CSF metrics may be transmitted to the base station. Periodicity of CSF report scheduling or other CSF report scheduling factors may be taken into consideration in generation of the CSF metrics.

21 Claims, 6 Drawing Sheets

| CQI Index | Modulation | Code Rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 6

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

ADAPTIVE GENERATION OF CHANNEL STATE FEEDBACK (CSF) BASED ON BASE STATION CSF SCHEDULING

PRIORITY CLAIM

The present application claims benefit of priority to U.S. Provisional Application No. 61/622,737 titled "Adaptive Generation of Channel State Feedback (CSF) Based on Base Station CSF Scheduling" and filed on Apr. 11, 2012, whose inventors are Zhu Ji, Navid Damji, and Johnson O. Sebeni, and which is hereby incorporated by reference in its entirety as thought fully and completely set forth herein.

FIELD OF THE INVENTION

The present application relates to wireless devices, and more particularly to a system and method for adaptively generating and transmitting channel state feedback (CSF) based on base station CSF scheduling.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

In order to provide improved communication between a base station (BS) and wireless user equipment (UE) devices, the UE may calculate various metrics that indicate channel quality for feedback to the base station. Without loss of generality, these metrics may be referred to as channel state feedback (CSF). The base station can use this channel state feedback to adjust its communication with the UE to provide improved communication with the UE. For example, these CSF metrics may be used by the BS to determine code rates and modulation scheme to be assigned to each UE. The code rates and modulation scheme may be selected not only to maximize the throughput to a particular UE, but also to improve the overall throughput of the base station communication area (e.g., the cell) through scheduling. The use of channel quality indicators thus allows the base station to more fully exploit the status of the wireless channel to improve communication throughput with various UEs.

A metric used in channel state feedback may be indicative of the communication quality of wireless channels. The UE may generate various metrics for a channel based on its received downlink (DL) signals, and these metrics may be used in determining the channel state feedback for the channel. These metrics may include estimation of the spectral efficiency, the number of data layers, the pre-coding matrices in the scenarios of multiple input and multiple output (MIMO) antenna systems, etc. CSF for a channel can be computed based on other performance metrics, such as a signal-to-noise ratio (SNR), signal-to-interference plus noise ratio (SINR), signal-to-noise plus distortion ratio (SNDR), and so forth of the channel.

The CSF for a given channel can also be dependent upon the transmission (modulation) scheme used by the communications system. For example, a communications system using code-division multiple access (CDMA) can make use of a different CSF than a communications system that makes use of orthogonal frequency division multiplexing (OFDM). In more complex communications systems, such as those making use of multiple-input multiple output (MIMO) and space-time coded systems, the CSF used can also be dependent on receiver type. Other factors that may be taken into account in generating a CSF are performance impairments, such as Doppler shift, channel estimation error, interference, and so forth. Therefore, in order to better reflect the true channel conditions, the CSF that is fed back to the base station may take into consideration multiple factors, including the receiver algorithms, DL channel configurations, MIMO configurations, and Doppler shift of the channels, among other factors.

The generation of channel state feedback by the UE is important in improving use of the communication channel. Therefore, improvements are desired in the generation of CSF in wireless communication systems.

SUMMARY OF THE INVENTION

Embodiments of the invention may relate to a system and method for adaptive generation of channel state feedback (CSF) based on scheduling of CSF reports by a base station. The CSF report scheduling behavior of the base station has conventionally been overlooked in generating CSF metrics. Base stations may frequently schedule CSF reports from wireless devices with which they are in communication in a manner consistent with the base station's use of the CSF reports in scheduling communications with the wireless device and other wireless devices. For example, at different times, a base station may be more concerned with the long-term stability of a channel, or channel variations over a short time frame, or even an instantaneous snapshot of channel conditions.

In particular, in some embodiments the (approximate or exact) periodicity with which a base station schedules a wireless device to report its CSF metrics may correspond to different preferences with respect to the nature of CSF reports. Thus, in order to generate an effective CSF estimation algorithm, in some embodiments the wireless device takes into consideration not only various receiver factors, but also the CSF scheduling behaviors at the base station.

Thus, one set of embodiments of the disclosure relate to an adaptive CSF generation method for wireless receivers based on CSF report scheduling of a base station. Time and/or frequency filtering of CSF metrics may be adapted at the wireless device based on the periodicity of CSF scheduling signaled from the base station. For example, if the base station schedules CSF reports with short periodicity, the wireless device may perform filtering over a shorter period of time, whereas if the base station schedules CSF reports with long periodicity, the wireless device may perform filtering over a longer period of time.

Certain embodiments of the disclosure are directed to a method for adaptively generating CSF metrics based on CSF scheduling behaviors and a wireless user equipment (UE) device configured to implement the method. The UE may include one or more antennas for performing wireless communications with a base station and device logic (which may include a processor and memory medium and/or hardware logic) configured to implement the method. Embodiments are also directed to a memory medium (e.g., a non-transitory memory medium) comprising program instructions executable by a processor to perform part or all of the method. The method may be performed as follows.

Channel state feedback (CSF) report scheduling information may be received from the base station. The CSF report scheduling information may be received via initial static or semi-static configuration settings (e.g., at the beginning of a call), or via dynamic grants, or both (e.g., different types of CSF report scheduling information might be received at different times). The CSF report scheduling information may include a periodicity of CSF report scheduling, or other information indicative of a periodicity of CSF report scheduling. The periodicity of CSF report scheduling may be determined based on the CSF report scheduling information. One or more CSF metrics may be generated at least in part based on the CSF report scheduling information. A CSF report may be transmitted to the base station. The CSF report may include the one or more CSF metrics generated based on the CSF report scheduling information.

In some embodiments, a spectral efficiency metric of a channel (e.g., on which wireless communication with the base station is performed) may be generated (e.g., estimated). Time-domain filtering of the SE metric may be performed using a time constant selected based on the periodicity of CSF report scheduling. The time-domain filtering of the SE metric may be performed as part of generating the one or more CSF metrics.

In some embodiments, it may be determined that an aperiodic CSF report is scheduled. In this case, in order to generate the one or more CSF metrics, time-domain filtering of the SE metric may be performed using a time constant selected based on the aperiodicity of CSF report scheduling.

The CSF report scheduling information may indicate a desired subband size of a CSF report, in some embodiments. Frequency domain averaging may be performed based on the desired subband size of the CSF report in order to generate the one or more CSF metrics in this case.

In some embodiments, the time constant may be determined based on a periodicity-to-time-constant table. The periodicity-to-time-constant table may, for example, map periodicity of CSF report scheduling values to time constant values for use in generating CSF reports.

In some embodiments, different time constants may be selected for SE filtering at different times, e.g., based on different periodicity of CSF report scheduling. Thus, a first time constant might be used to filter an SE estimation and generate CSF metrics in response to determining that CSF reports are scheduled at a first periodicity at a first time, while a second time constant might be used to filter an SE estimation and generate CSF metrics in response to determining that CSF reports are scheduled at a second periodicity at a second time.

In some embodiments, the CSF report scheduling information may be stored in a memory of the UE.

In addition to considering CSF report scheduling behavior of the BS, one or more parameters of the UE may be determined and considered in generating CSF metrics, in some embodiments. For example, such factors as receiver type, multiple input-multiple output (MIMO) scheme, and amount of Doppler shift may be determined and considered in generating CSF metrics.

BRIEF DESCRIPTION OF THE DRAWINGS

A better understanding of the present invention can be obtained when the following detailed description of the embodiments is considered in conjunction with the following drawings.

FIG. 6 illustrates an exemplary table of CQI values according to one embodiment; and FIG. 7 illustrates an exemplary table of modulation and coding schemes which is used in the CQI adaptation method of FIG. 5 according to one embodiment.

Figure 1A:
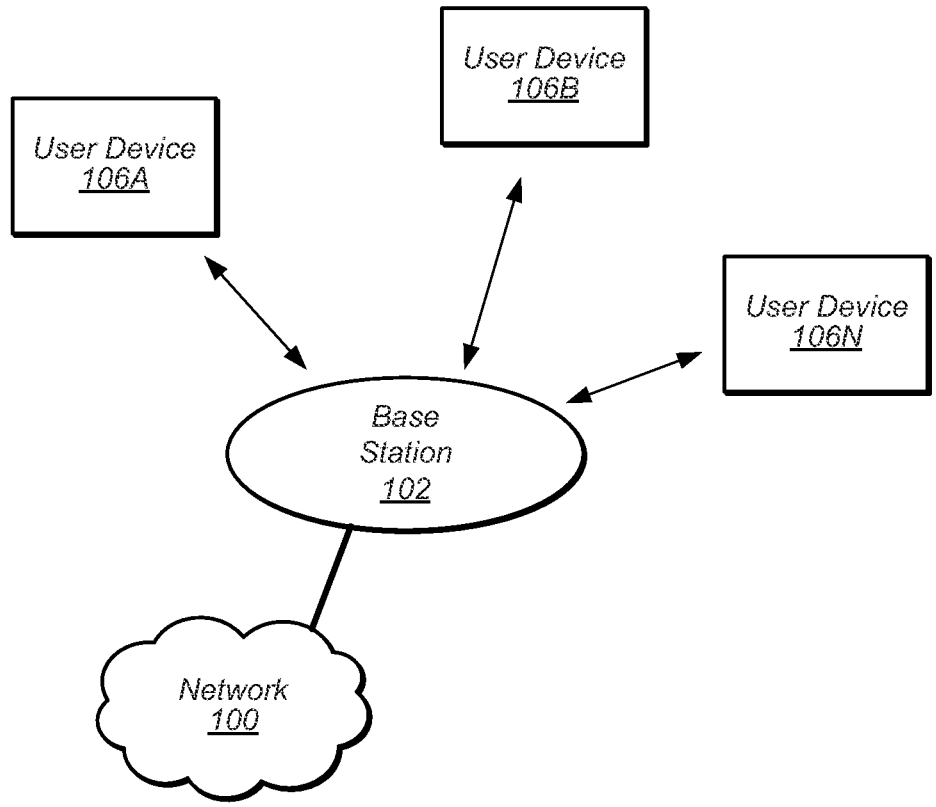
FIG. 1A illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
BLER: Block Error Rate (same as Packet Error Rate)
BER: Bit Error Rate
CRC: Cyclic Redundancy Check
DL: Downlink
PER: Packet Error Rate
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
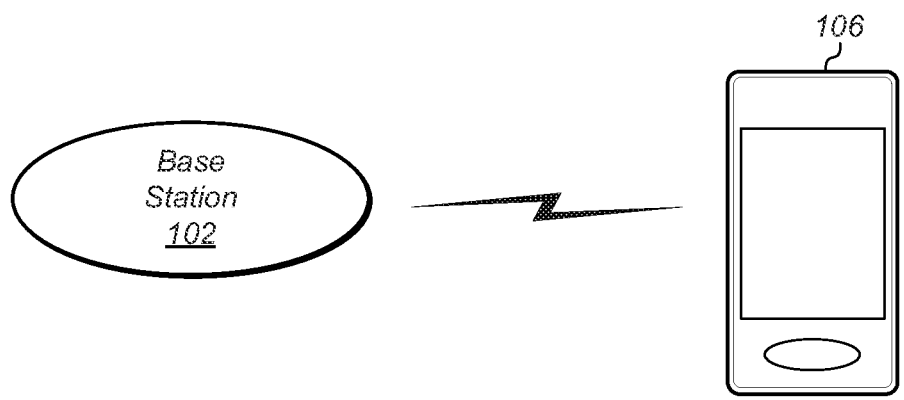
FIG. 1B illustrates a base station in communication with user equipment.

FIGS. 1A and 1B—Communication System

FIG. 1A illustrates an exemplary (and simplified) wireless communication system. It is noted that the system of FIG. 1A is merely one example of a possible system, and embodiments of the invention may be implemented in any of various systems, as desired.

As shown, the exemplary wireless communication system includes a base station 102 which communicates over a transmission medium with one or more User Equipment (UE) (or "UE devices") 106A through 106N.

The base station 102 may be a base transceiver station (BTS) or cell site, and may include hardware that enables wireless communication with the UEs 106A through 106N. The base station 102 may also be equipped to communicate with a network 100. Thus, the base statation 102 may facilitate communication between the UEs and/or between the UEs and the network 100. The communication area (or coverage area) of the base station may be referred to as a "cell." The base station 102 and the UEs may be configured to communicate over the transmission medium using any of various radio access technologies (RATs), also referred to as wireless communication technologies such as GSM, CDMA, WLL, WAN, WiFi, WiMAX, etc.

FIG. 1B illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE may perform any of the embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to generate channel state feedback (CSF) reports that may be provided back to the base station 102. The base station 102 may use CSFs received from one or more base stations to adjust its communications with the respective UE 106, or possibly other UEs 106. For example, in one embodiment the base station 102 may receive and utilize CSFs from multiple UEs 106 to adjust its communication scheduling among the various UEs within its coverage area (or cell).

User equipment (UE) 106 may use a CSF generation method as described herein to determine the CSF that is fed back to the base station (BS). In one embodiment, the generation of the CSF is performed based on CSF report scheduling by the base station. As described below, in some embodiments the BS may schedule CSF reports with a certain regular periodicity, or may aperiodically request CSF reports. The UE may utilize its knowledge or estimation of the periodicity of the CSF report scheduling, or the aperiodic nature of CSF report scheduling, to adaptively modify the nature of the CSF generation process.

Figure 2:
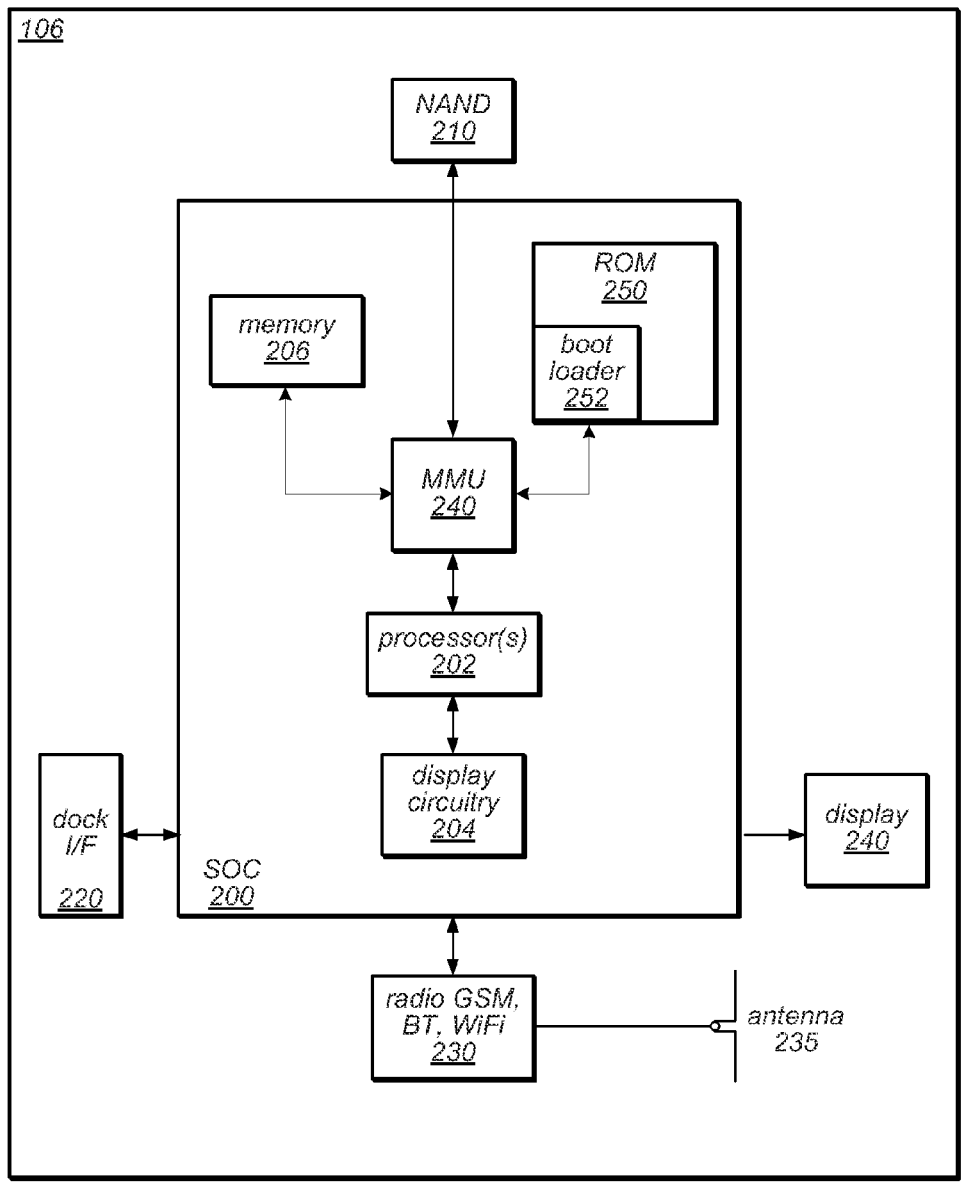
FIG. 2 illustrates an exemplary block diagram of a UE, according to one embodiment.

FIG. 2—Exemplary Block Diagram of a UE

FIG. 2 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. The MMU 240 may be configured to perform memory protection and page table translation or set up. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for GSM, Bluetooth, WiFi, etc.) which may use antenna 235 to perform the wireless communication. As described herein, the UE 106 may include hardware and software components for generating and/or providing CSF values to a base station.

Figure 3:
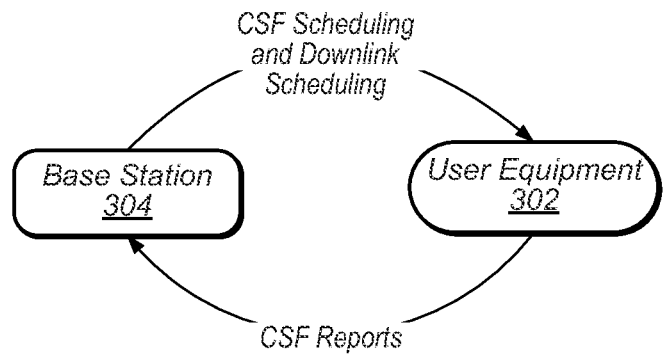
FIG. 3 is a system diagram illustrating adaptive CSF report generation by a UE based on CSF report scheduling by a BS according to one embodiment.
Figure 4:
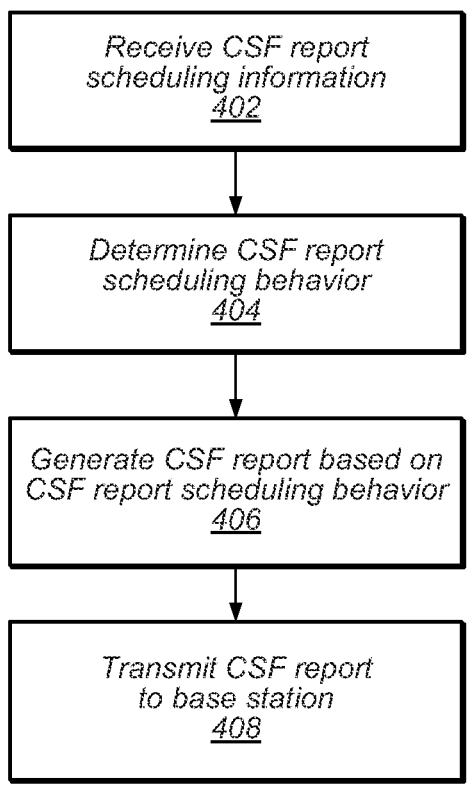
FIG. 4 is a flowchart diagram illustrating a method for a UE to adaptively generate CSF reports based on CSF report scheduling according to one embodiment.

FIGS. 3-4—Adaptive CSF Report Generation Based on CSF Report Scheduling

FIG. 3 is a system diagram illustrating adaptive CSF report generation by a user equipment device 302 based on CSF report scheduling by a base station 304. As shown, the BS 304 may provide CSF scheduling and downlink scheduling information to the UE 302. Note that the BS may determine its CSF scheduling behavior based on its optimization criteria (e.g., stability with long periodicity or dynamic scheduling with shorter periodicity). The UE 302 may in turn provide CSF reports to the BS 304, which may be generated in part based on CSF scheduling behaviors as determined from the CSF scheduling information. The BS 304 may make subsequent downlink scheduling decisions (e.g., in order to optimize throughput with the UE 302 and overall throughput in the cell) based on the CSF reports provided to the BS 304 by the UE 302 (and possibly based on CSF reports provided to the BS 304 by other UEs).

FIG. 4 is a flowchart diagram illustrating a method for adaptively generating CSF reports based on CSF report scheduling that may be performed by the UE 302. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

As shown, in 402, CSF report scheduling information may be received by a UE device. The CSF report scheduling information may be received wirelessly from a base station, e.g., a base station which communicatively couples the UE with a core network (e.g., a circuit switched network and/or a packet switched network).

According to some embodiments, multiple types of CSF scheduling at the BS may be possible. Two possible types of CSF scheduling may include periodic CSF reports and aperiodic CSF reports.

Periodic CSF reports may be scheduled with a certain periodicity, such that the UE may provide CSF reports to the BS at regular intervals. The periodicity of the CSF report scheduling may be arranged semi-statically at the time of call setup, in some embodiments. In other embodiments, the periodicity of periodic CSF may be modified by the BS at-will (e.g., during a call or at another time), and/or may be scheduled for longer time frames than per-call. Information indicating the arranged periodicity may be stored (e.g., as part of system configuration information) for use in scheduling future CSF reports at the UE and/or for use in modifying the manner in which CSF reports are generated (e.g., as further described below).

Aperiodic reports may also or alternatively be dynamically requested in some embodiments. For example, if a BS determines that it needs a CSF report for DL scheduling purposes, the BS may provide an indication of this to the UE. This may, for example, include assigning a grant to the UE so that the UE may provide a CSF report to the BS. In some embodiments, an aperiodic scheduling mechanism (e.g., dynamically allocating grants for CSF reports) may be used in a periodic or semi-periodic manner. For example, a BS may dynamically request an aperiodic CSF report approximately every 30 ms (or every 20 ms, or at any other desired interval) during a call, in some embodiments.

Note that while in some embodiments periodic and aperiodic CSF reports may be used independently, in other embodiments they may be used in conjunction with one another. For example, the base station may schedule periodic CSF reports during call setup and also occasionally dynamically schedule an aperiodic CSF report as a supplement to the periodically scheduled CSF reports.

Furthermore, according to some embodiments, different types of CSF reports may be scheduled by the BS. Two possible types of CSF reports might include wideband reports and M-subband reports, corresponding, for example, to CSF reports averaged over the entire width of a channel (e.g., wideband) or over a subset of the channel (e.g., over one or more subbands of the channel). Other types of CSF reports are also possible.

Thus, the CSF report scheduling information received by the UE from the BS may include call setup information indicating a periodicity of periodic CSF report scheduling, indication of a grant received from the BS for transmitting an aperiodic CSF report, information indicating types of CSF reports scheduled, and/or any of various other types of information indicative of CSF report scheduling behaviors of the base station.

In 404, the UE may determine CSF report scheduling behavior based on the received CSF report scheduling information. The CSF report scheduling information may be indicative of how the CSF reports will be used for DL scheduling at the BS. For example, according to some embodiments, a longer periodicity may indicate that the stability and long-term averaging effects of the channel have a greater impact on DL scheduling, while shorter periodicity may indicate that the DL scheduling is designed to respond quickly to channel variations and adapt to the channel more dynamically.

Thus, according to some embodiments, determining CSF report scheduling behavior may include determining a (e.g., approximate or exact) periodicity of CSF report scheduling. Note that in some embodiments, the UE may determine a periodicity of the BS CSF scheduling based on either aperiodic CSF scheduling or periodic CSF scheduling. For example, in periodic CSF scheduling, determining the CSF report scheduling behavior may be based directly on the periodicity arranged during initial call setup. If aperiodic CSF scheduling is performed at (e.g., approximately or exactly) regular intervals (e.g., in embodiments in which periodic CSF scheduling is not used), the UE may consider when it last received a grant to transmit a CSF report, or an average of how often the BS has allocated CSF report grants to the UE over multiple previous CSF reports, or one or more other factors in determining the periodicity of the BS CSF scheduling.

Note that in some cases, for example in some embodiments in which aperiodic CSF scheduling is used by the BS to supplement periodic CSF scheduling, scheduling of an aperiodic CSF report may be indicative of a desire by the BS to acquire a snapshot of the channel status. In such embodiments, the UE may not attempt to determine a periodicity of (e.g., recent) aperiodic CSF report requests, but may interpret the scheduling of the aperiodic CSF report as an indication that the BS desires a CSF report which is indicative of the channel state over a very short or instantaneous time scale.

In 406, the UE may generate a CSF report based on the determined CSF report scheduling behavior. The UE may adaptively modify its CSF report generating behavior based on the type of scheduling behavior shown by the BS, in order to provide more helpful information in consideration of the scheduling behavior shown by the BS.

Generating the CSF report may include calculating (e.g., estimating) one or more metrics which are indicative of channel quality. The particular metrics used by the UE and the BS may be different for different wireless communication protocols. As one example, a CSF report may include a channel quality indicator (CQI), a precoding matrix index (PMI), and a rank indication (RI). These particular metrics are described in further detail below with respect to FIGS. 5-7, including specific ways in which calculation of these metrics may be tailored to the DL scheduling behaviors of the BS as indicated by the CSF scheduling behaviors. Other wireless communication protocols may use different CSF metrics, and may utilize the CSF scheduling information in calculating those metrics in different ways.

Generally speaking, however, it may be desirable to generate CSF reports in a manner that favors stability in response to longer periodicity of periodic CSF report scheduling, while it may be desirable to generate CSF reports in a manner that better tracks channel variations (e.g., in fading scenarios) in response to shorter periodicity of periodic CSF report scheduling. For example, according to one set of embodiments, if the BS schedules CSF reports with larger periodicity, the UE may generate the CSF reports with more filtering, since the scheduling rate from the BS indicates that it favors the stability of the CSF report. Conversely, if the BS schedules CSF with smaller periodicity, the UE may generate the CSFs with less filtering (thus better tracking the channel variations in fading scenarios).

Note that the examples above describe a generalized delineation between 'shorter periodicity' and 'longer periodicity' (and a further delineation between periodic and aperiodic scheduling). In accordance with this, in some embodiments, the UE may differentiate between the 'shorter periodicity' and 'longer periodicity' designations based on some predefined or dynamically defined periodicity threshold, and may utilize a first CSF generation technique (e.g., using a first CSF filtering or averaging constant or set of constants) for shorter periodicity and a second CSF generation technique (e.g., using a second CSF filtering or averaging constant or set of constants) for longer periodicity.

However, in other embodiments, finer grained differentiation may be more appropriate. For example, any number of variations of a CSF generation technique may be used for different periodicities, e.g., depending on the desired granularity of response to the BS CSF report scheduling behavior. Thus, in one set of embodiments, a look-up table may be used to determine an appropriate CSF generation technique based on the BS CSF report scheduling behavior; alternatively, or in addition, a calculation may be performed to generate appropriate contributions to the CSF generation technique based on the periodicity of the BS CSF report scheduling.

In 408, the CSF report may be transmitted from the UE to the BS. The CSF report may be transmitted wirelessly, e.g., according to a radio access technology/wireless communication protocol used by the UE and the BS. The BS may utilize the CSF report in downlink scheduling.

Figure 5:
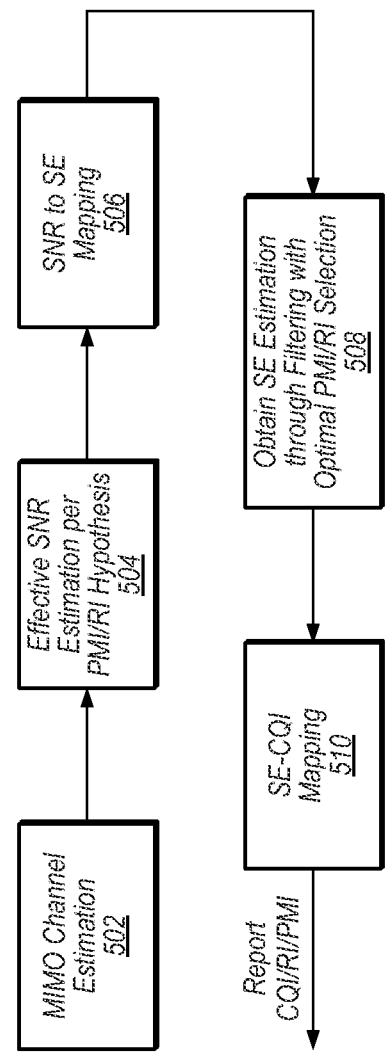
FIG. 5 is a flowchart diagram illustrating a method for generating a CSF report according to one embodiment.

FIGS. 5-7—Exemplary CSF Report Generation

FIG. 5 illustrates embodiments of a method for generating channel state feedback according to one embodiment of the invention. The method of FIG. 5 may generate a CSF report that is based on CSF report scheduling by the base station. More specifically, the method of FIG. 5 may be used once CSF report scheduling behavior has been determined by the UE, and may include factoring the CSF report scheduling behavior into the algorithm for how the CSF report is calculated. In one embodiment, the process shown in FIG. 5 is an example of the method that may be performed in 406 of FIG. 4. The method of FIG. 5 may be preferably performed during use or operation of the UE.

According to some embodiments, the method of FIG. 5 may be performed in conjunction with a standard or system in which the CSF report may include three components, which may be referred to as a channel quality indicator (CQI), a precoding matrix index (PMI), and a rank indication (RI). For example, according to one set of embodiments, the method of FIG. 5 may be performed in conjunction with an LTE communication system, which may utilize CQI, PMI, and RI metrics as components of CSF reports.

Note that the method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, the method of FIG. 5 may operate as follows.

In 502, MIMO channel estimation and/or noise estimation may be performed. In one embodiment, the channel estimation may be used to generate a whitened channel estimation matrix for CQI calculation.

In 504, effective SNR estimation per PMI/RI Hypothesis may be determined. In one embodiment, the SNR estimation may be based on the whitened channel estimation and the receiver algorithm (e.g., LMMSE, MLM, LMMSE-SIC, among other possibilities).

In 506, an SNR to SE mapping may be performed, e.g., using a SNR to SE mapping table. The SNR to SE mapping may consider the channel capacity as well as the possible loss due to practical receivers. Note that the SE estimation can be done in a finer granularity on a small number of resource blocks (e.g., two RBs). In some such cases, the subband SE may be averaged across the channel to produce a wideband (WB) estimation of SE.

In 508, an estimation of the SE through filtering with the optimal PMI/RI (precoding matrix index/rank index) selection may be performed. Filtering of the SE may be very important for CQI/PMI/RI reporting. Filtering (or averaging) over time may reflect how fast the UE responds to the channel or related spectral efficiency changes.

Some examples of filtering mechanisms include finite impulse response (FIR) and infinite impulse response (IIR) filters. FIR filtering may have a fixed length of memory and may be a weighted sum of previous SE estimation. An IIR filter may have a memory of infinite length, with the impact of each sample exponentially decreasing, which may generally provide a smoother weighted average across the time. A simple IIR filter might be a single-pole IIR filter, in which the time constant may be approximated as the inverse of the IIR filter coefficient. Note that, conceptually, filtering over time with a weighted sum of previous SE estimations may include separate time and weight factors, or may include combining time and weight into a single factor (e.g., constant).

Furthermore, the CSF report may be either a wideband (WB) report or an M-subband report, in some embodiments. The WB report may require the UE to report an averaged WB estimation of the CSF metrics. The M-subband CSF report mode may include the UE reporting the subband CSF metrics on M different subbands with a defined number of RBs. Note that in an LTE scenario, each RB contains 12 tones and has a 180 kHz bandwidth. Thus depending on the CSF reporting mode, the SE averaging or filtering may also need to be performed in the frequency domain.

According to one set of embodiments, the UE may be configured to base its filtering behavior on the CSF scheduling behavior of the BS. For example, as noted above with respect to FIG. 4, in some embodiments the UE may determine a periodicity of CSF report scheduling (whether the CSF reports are scheduled periodically or aperiodically), which may be different at different times depending on which factors the BS considers important for DL scheduling at any given time. Longer periods between CSF reports may be indicative of a higher consideration for stability and long-term averaging effects of the channel in DL scheduling. In such cases, bigger time constants (e.g., averaging over a longer time period) may be used for spectral efficiency filtering when the BS station CSF scheduling behavior corresponds to longer periodicity. Conversely, shorter periods between CSF reports may indicate that the BS DL scheduling is designed to respond quickly to channel variations and adapt to the channel more dynamically. In this scenario, the UE may select a smaller time constant (e.g., averaging over a shorter time period) for SE filtering.

In some embodiments, an equation or mapping table may be used to determine an appropriate time constant for a given periodicity of CSF report scheduling. For example, an equation relating periodicity values to time constant values might be used to determine the appropriate time constant for a given periodicity of CSF report scheduling. Alternatively, a table might be used to map different ranges of periodicity values to particular time constant values. The equation, table, or other technique for determining an appropriate time constant value based on a periodicity value may be determined based on theoretical optimization and/or testing, in various embodiments. For example, one or more UEs might be tested with one or more BSs under various test conditions prior to deployment to construct an equation or table that appropriately relates periodicity values and time constant values. The UE might thus be configured (e.g., offline, prior to deployment) to utilize the equation and/or table, such that it would be available for use (e.g., online, during communication with the BS) as part of the method of FIG. 5.

In some embodiments (e.g., in which aperiodic CSF report scheduling supplements periodic CSF report scheduling) aperiodic CSF reports may be scheduled by the base station to poll the channel status from the UE. This may indicate that the BS wants a snapshot of the channel status. Correspondingly, in some embodiments, in response to an aperiodic CSF report request (e.g., a grant to transmit the CSF report on the UL) the UE may generate a CSF report utilizing different filtering/averaging from that used in generating a periodically scheduled CSF report. For example, in some embodiments, no filtering or averaging over time may be performed, or a very small time constant may be selected (e.g., to filter or average over a very short period of time).

Note additionally that generating the CSF report may also include performing adaptive averaging in the frequency domain, in some embodiments. For example, as noted above, the CSF report may be either wideband or subband in some embodiments. In the scenario of M-subband CSF reporting, the CQI calculation and averaging in the frequency domain may also adapt to the subband size scheduled by the BS, e.g., to better exploit the frequency selectivity that matches the scheduling algorithm of the BS.

In 510, SE to CQI mapping may be performed to determine the CQI, e.g., using an SE-CQI mapping table. For example, FIG. 6 provides an exemplary CQI mapping table according to one embodiment. Other SE-CQI mapping tables may alternatively be used. Additionally, in some embodiments, multiple SE-CQI mapping tables may be available to the UE, and the UE may select a most appropriate SE-CQI mapping table to use in mapping SE to CQI, e.g., depending on receiver conditions or other factors. The CQI/RI/PMI values may then be reported, e.g., as a CSF report.

As noted above, according to one set of embodiments, the systems and methods described herein may be used in conjunction with an LTE communication system. The following description includes more specific implementation details for one exemplary LTE embodiment.

In LTE, the CSF report includes the following three components: channel quality indicator (CQI), precoding matrix index (PMI), and rank indication (RI).

CQI may be defined as follows. Based on an unrestricted observation interval in time and frequency, the UE derives for each CQI value reported in uplink subframe n the highest CQI index between 1 and 15 in the table of FIG. 7 which satisfies the following condition, or CQI index 0 if CQI index 1 does not satisfy the condition: A single Physical Downlink Shared Channel (PDSCH) transport block with a combination of modulation scheme and transport block size corresponding to the CQI index, and occupying a group of downlink physical resources blocks termed the CQI reference resource, could be received with a transport block error probability not exceeding 0.1.

FIG. 7 illustrates an exemplary modulation and coding scheme MCS table illustrating an increasing set of schemes which may be used in some embodiments, although other MCS values and schemes are envisioned. As shown, the MCS table includes an index column, a modulation order column, and a total block size index column. In LTE, the modulation and coding schemes are defined to allow different levels of coding rates and modulation orders for physical downlink shared channel (PDSCH) DL. The Transport Block Size (TBS) index may be used in transport block size tables defined in the LTE standard.

PMI may be defined as the precoding matrix index that the UE can feedback to the BS for its selection of precoding matrix to optimize the throughput. The UE may typically determine the optimal PMI based on its channel estimation and calculate the expected throughput with available hypotheses of precoding matrices.

RI may be defined as an indicator that signals to the BS the number of transmission layers that the UE can support to optimize throughput.

Based on the description of the CQI definition for LTE, in one embodiment it may be desirable for the UE to achieve the 10% block error rate (BLER) target for any CQI given the DL configuration defined the LTE protocol. Also, the scheduling algorithm at the BS can be designed according to this exemplary UE requirement to improve the throughput. Note that what is proposed in the LTE specification is one way of reporting and using CQI for optimizing the receiver throughput, which sets a fixed BLER target for the UE that can simplify the optimization at the BS. However, in order to further improve performance, an adaptive BLER target can be used based on the UE channel conditions and network scenarios. Thus, while a fixed BLER target may be used according to some embodiments of this disclosure, the methods described herein can be used with variable BLER targets for CQI in other embodiments.

Note that for MIMO transmissions, multiple hypotheses of the precoding matrices and rank selection (the number of spatial layers) can be tried by the UE to determine the optimal PMI and RI.

Further Embodiments

Note that in the present description, some of the embodiments are described in the context of LTE (Long-term evolution of UMTS). However, it is noted that the methods described herein can be generalized for CSF reporting using other wireless technologies and are not limited to the specific descriptions provided above.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device, the UE device comprising:
an antenna for performing wireless communications with a base station;
device logic coupled to the antenna and configured to:
receive, via the antenna, channel state feedback (CSF) report scheduling information from the base station;
determine a periodicity of CSF report scheduling based on the CSF report scheduling information;
generate one or more CSF metrics based at least in part on the CSF report scheduling information;
generate a spectral efficiency (SE) metric of a channel;
perform time-domain filtering of the SE metric using a time constant selected based on the periodicity of CSF report scheduling, wherein time-domain filtering of the SE metric is performed as part of generating the one or more CSF metrics,
transmit, via the antenna, a CSF report to the base station, wherein the CSF report comprises the one or more CSF metrics generated based on the CSF report scheduling information.

2. The UE device of claim 1,
wherein the CSF report scheduling information indicates that CSF reports are scheduled in a periodic manner according to the periodicity.

3. The UE device of claim 2, wherein the CSF report scheduling information also indicates that an aperiodic CSF report is scheduled, wherein the device logic is further configured to:
generate a spectral efficiency (SE) metric of the channel based on the indication that the aperiodic CSF report is scheduled; and
perform time-domain filtering of the SE metric using a time constant selected based on the aperiodicity of the scheduled CSF report.

4. The UE device of claim 1,
wherein the CSF report scheduling information comprises an aperiodic request for a CSF report, wherein determining the periodicity of CSF report scheduling comprises estimating a periodicity of CSF report scheduling based on the aperiodic CSF report request and a plurality of previous aperiodic CSF report requests received from the base station.

5. The UE device of claim 1,
wherein the CSF report scheduling information indicates a desired subband size of a CSF report;
wherein, in order to generate the one or more CSF metrics based on the CSF report scheduling information, the device logic is further configured to perform frequency domain averaging based on the desired subband size of the CSF report.

6. A method performed by wireless user equipment (UE) device, the method comprising:
receiving channel state feedback (CSF) report scheduling information from a base station;
determining a periodicity of CSF report scheduling based on the CSF report scheduling information, wherein said determining the periodicity of CSF report scheduling comprises:
  if the CSF report scheduling information indicates that CSF reports are scheduled in a periodic manner with the periodicity, determining the periodicity of CSF report scheduling based on the indication thereof from the CSF report scheduling information;
  if the CSF report scheduling information does not indicate that CSF reports are scheduled in a periodic manner, and if the CSF report scheduling information indicates that an aperiodic CSF report is requested, estimating the periodicity based on the aperiodic CSF report request and timing of one or more previous aperiodic CSF report requests;
determining at least one element for use in generating a CSF report based on the CSF report scheduling information, wherein the at least one element for use in generating the CSF report comprises a time constant for use in time-domain filtering of a spectral efficiency metric;
generating the CSF report using the determined at least one element;
transmitting the CSF report to the base station.

7. The method of claim 6, wherein the time constant is determined based on the periodicity of CSF report scheduling.

8. The method of claim 6, wherein the time constant is determined based on a periodicity-to-time-constant table, wherein the periodicity-to-time-constant table maps periodicity of CSF report scheduling values to time constant values for use in generating CSF reports.

9. A non-transitory computer accessible memory medium storing program instructions executable by a wireless user equipment (UE) device to:
  receive first channel state feedback (CSF) report scheduling information from a base station, wherein the first CSF report scheduling information indicates a first periodicity of CSF report scheduling;
  generate a first spectral efficiency (SE) estimation of a channel;
  filter the first SE estimation of the channel in the time domain using a first time constant to generate a first filtered SE estimation, wherein the first time constant is selected based on the first periodicity of CSF report scheduling;
  generate first one or more CSF metrics based on the first filtered SE estimation of the channel;
  transmit a first CSF report to the base station, wherein the first CSF report comprises the first one or more CSF metrics generated based on the first filtered SE estimation.

10. The memory medium of claim 9, wherein the program instructions are further executable to, at a later time:
  receive second CSF report scheduling information from the base station, wherein the second CSF report scheduling information indicates a second periodicity of CSF report scheduling;
  generate a second spectral efficiency (SE) estimation of a channel;
  filter the second SE estimation of the channel in the time domain using a second time constant to generate a second filtered SE estimation, wherein the second time constant is selected based on the second periodicity of CSF report scheduling;
  generate second one or more CSF metrics based on the second filtered SE estimation of the channel;
  transmit a second CSF report to the base station, wherein the second CSF report comprises the second one or more CSF metrics generated based on the second filtered SE estimation.

11. The memory medium of claim 10,
  wherein the first CSF report scheduling information is received during initial call setup of a first call;
  wherein the second CSF report scheduling information is received during initial call setup of a second call.

12. The memory medium of claim 10,
  wherein the first CSF report scheduling information is received during initial call setup of a first call;
  wherein the second CSF report scheduling information is received during the first call.

13. The memory medium of claim 12,
  wherein the first CSF report scheduling information indicates a periodic CSF report scheduling behavior with the first periodicity;
  wherein the second CSF report scheduling information is an aperiodic request for a CSF report.

14. A user equipment (UE) device, the UE device comprising:
  an antenna for performing wireless communications with a base station;
  a memory which stores channel state feedback (CSF) report scheduling (scheduling rate) information of the base station;
  a processor coupled to the memory and the antenna and configured to:
    determine one or more parameters of the UE device during operation of the UE; and
  generate channel state feedback based on the one or more parameters and the CSF report scheduling information, wherein in generating the channel state feedback the processor is configured to perform filtering of a spectral efficiency metric, wherein the processor is configured to adjust filtering of the spectral efficiency metric based on the CSF report scheduling information;
  wherein the UE device is configured to transmit the channel state feedback to a base station.

15. The UE device of claim 14,
  wherein the processor is configured to generate the at least one channel state feedback based on a periodicity of CSF report scheduling signaled from the base station.

16. The UE device of claim 15,
  wherein the UE device is configured to receive the CSF report scheduling information through at least one of: 1) static settings received during initial call setup; or 2) dynamic grants received during a call.

17. The UE device of claim 14,
  wherein the processor is configured to adjust a time constant of its spectral efficiency filtering in order to adjust filtering of the spectral efficiency metric.

18. The UE device of claim 14,
  wherein the CSF report scheduling information indicates base station scheduling with larger periodicity;
  wherein the processor is configured to generate the CSF with more filtering of the spectral efficiency metric.

19. The UE device of claim 14,
  wherein the CSF report scheduling information indicates base station scheduling with smaller periodicity;
  wherein the processor is configured to generate the CSF with less filtering of the spectral efficiency metric.

20. The UE device of claim 14, wherein the one or more parameters of the UE device include two or more of receiver type, multiple input-multiple output (MIMO) scheme, and amount of Doppler shift.

21. A non-transitory computer-accessible memory medium storing program instructions, wherein the program instructions, when executed by a wireless user equipment (UE) device, cause the UE device to:
- determine one or more parameters of the UE device during operation of the UE device;
- receive channel state feedback report scheduling information indicating a desired subband size of a channel state feedback metric;
- generate at least one channel state feedback metric based on the one or more parameters and the desired subband size of the CSF metric, wherein generating the at least one channel state feedback metric comprises performing frequency domain averaging based on the desired subband size of the CSF metric; and
- transmit the at least one channel state feedback metric to the base station.

* * * * *